SOUND AMPLIFYING APPARATUS FOR TELEPHONE CIRCUITS

Filed Feb. 9, 1954

INVENTOR.
DONALD C. BEATTY
BY Frederick A. Zoda
ATTORNEY 2,786,099
Patented Mar. 19, 1957

2,786,099

SOUND AMPLIFYING APPARATUS FOR TELEPHONE CIRCUITS

Donald C. Beatty, Birmingham, Ala.

Application February 9, 1954, Serial No. 409,033
8 Claims. (Cl. 179—1)

The present application covers a structure generally analogous to those in U. S. Patents No. 2,525,763 and No. 2,539,565, granted to me on October 17, 1950, and January 12, 1951, respectively, and is a continuation in part of my copending application Serial No. 193,988, filed November 3, 1950.

The invention relates to a novel electrical apparatus for amplifying the voice or other sound made by a party calling a telephone circuit to which the apparatus is attached, and for transmitting to the calling party the voice or sound made by any party or parties within the acoustical range of the device.

The invention also relates to improved electrical apparatus by means of which the operator is enabled to cause it to automatically function without his further action or attention, or, by adjustment to cause the device to remain in the inoperative condition until he elects to cause it to function or operate.

By way of background, it may be noted that the desirability of apparatus of the character mentioned is readily apparent as being in the interest not only of the general public in conducting its individual or personal affairs, but also of individuals of the many professions, business firms, organizations and departments of state and federal governments. Such apparatus fills a long felt need in connection with the conducting of one's personal and business affairs and in the conducting of business in general, both private and government. This is so because in the normal use of the telephone over which a high percentage of personal and business affairs is conducted, the user thereof must go to that instrument and remain in its immediate vicinity while utilizing one of his hands to hold the ear piece and microphone of the instrument to his ear and mouth respectively. This makes it difficult, if not impossible for the user at the same time to use his hands and head in a normal manner while for example, copying the transmitted intelligence, making of memoranda, the searching through notes, files or papers for data or to move away from the very immediate vicinity of the telephone instrument.

It is, accordingly, the main object of the present invention to provide apparatus which will be capable of eliminating the current difficulty above described.

Other important objects are to provide apparatus as stated that will be simple and compact; will be attachable to a conventionally installed telephone instrument or connecting wires thereto; will be capable of installation with a minimum expenditure of time and effort; will offer no problems in the use thereof by the parties; will be economical in construction; and by election of the user, will be automatic in operation or remain inoperative until manually caused to function or operate.

In simple terms the invention, automatically or by manual control of the operator, operates over a telephone circuit similarly to the manner by which a conventional office intercommunication set operates to and between nearby offices. The apparatus permits full two-way conversations without the inconvenience of manual or other circuit switching to permit either "listen" or "talk" functions of the device; when connected to a telephone circuit and adjusted to the automatic position and with proper electric power connected to the apparatus, the first ring of an incoming telephone call starts the apparatus. Without in any manner touching a nearby telephone which may be connected to the same telephone circuit, or in any manner lifting the receiver of such a telephone, the voice of the calling party is amplified and emitted from the loud speaker of the device with any selected volume of sound. A person or persons within the acoustical range of the device may then converse freely in a normal manner with said caller, and, upon termination of the conversation, or sooner, the calling party, by hanging up the receiver of his telephone instrument, will cause the apparatus to return to its normal standby or off condition. Also, the operator of the device may, at his election during normal use of the telephone, cause the apparatus to begin functioning and thereupon he may hang up his telephone and continue the conversation by means of the apparatus above described. As in the instant given above, the apparatus will automatically, following such use, return to the normal standby or off condition.

With the foregoing and other objects in view which will appear as the description proceeds, the invention consists of certain novel details of construction and combinations of parts, hereinafter more fully described and pointed out in the claims, it being understood that changes may be made in the construction and arrangements of parts without departing from the spirit of the invention as claimed.

Figures 1, 2, 3:
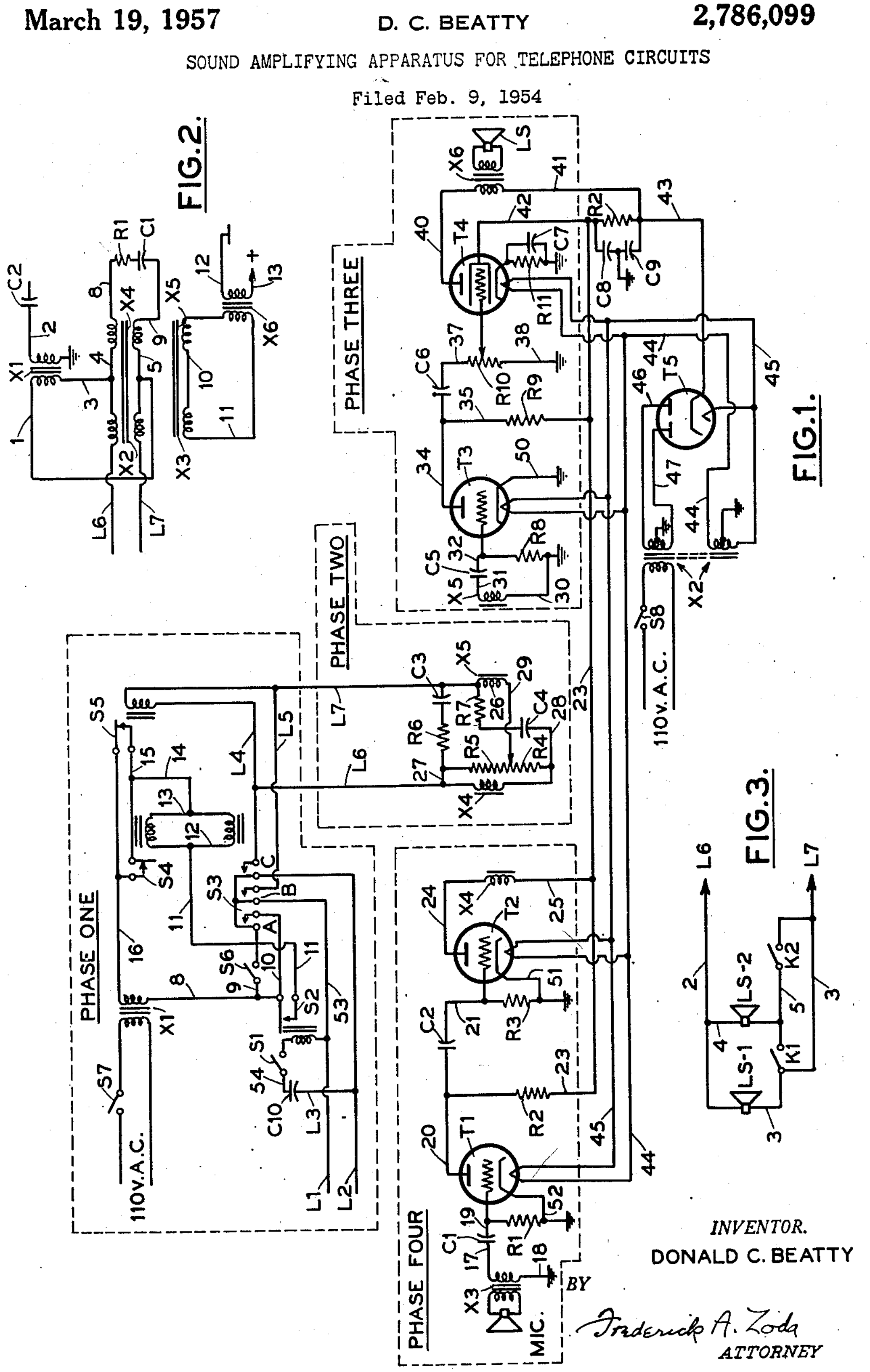
Figure 1 is a schematic representation or wiring diagram of the instant invention.
Figure 2 is a wiring diagram of a modified balancing and segregating network.
Figure 3 is a wiring diagram showing the invention embodied in an intercommunication system.

The description of the apparatus which follows, will be divided into four (4) general phases. Each phase pertains to a particular function performed by the apparatus, namely:

Phase 1. The manual or automatic control circuit.
Phase 2. The segregating or balancing network circuit.
Phase 3. The vacuum tube voltage amplifier "receiving" circuit.
Phase 4. The vacuum tube voltage generating "transmitting" circuit.

PHASE ONE

*Manual or automatic control circuit*

Referring to the drawing in detail, L1 and L2 are leads connected directly to an ordinary telephone circuit including a telephone, not shown, and its signal device, also not shown.

Extending respectively from the leads L1 and L2 are the leads L53 and L3, that are connected to the coil of relay S2, with lead L3 having in series connection therewith condenser C10, lead 54 and manually operated switch S1. Switch S1 is left in the open position for manual control of the device. Switch S1 is placed in the closed position for automatic operation of the apparatus.

Through the ordinary telephone circuit referred to above but not shown, there is adapted to pass a "sustaining" direct current, as for example, during ordinary conversation between a calling and a called party.

On other occasions, a current differing from the "sustaining" current referred to, is caused, automatically or otherwise, to pass through the telephone circuit to which leads L1 and L2 are electrically connected, for the purpose of causing actuation of a signal device such as a bell. This can be termed an "intermittent" current and is exemplified by the sending of alternating current surges at intervals through the telephone circuit for the purpose of ringing the bell, not shown.

Assuming that the switch S1 is in the closed position, the "intermittent" alternating current flowing through or over leads L1 and L2 will not only actuate the signaling device but will also flow through the coil winding of and energize relay S2. This will close the normally open switch contacts of relay S2, said relay being respondent to said intermittent current, so as to close a circuit including lead 8, the secondary winding of transformer X1, lead 16, through the normally closed switch contacts of relay S4, lead 15, lead 14, lead 13 to one side of the coil winding of relay S3, lead 12, the other side of coil of relay S3, lead 11 and back through the closed switch contacts of relay S2 to complete the closed circuit.

With switch S7 closed and the primary winding of transformer X1 connected to an appropriate source of electric power, the result of the above described closing of switch contacts of relay S2 will be that relay S3 is energized and closes its three normally open switch contacts A, B, and C. The closing of these switch contacts, among other things, places a short circuit across the switch contacts of relay S2. Therefore, there will be closed a circuit not by means of the closed switch contacts of relay S2 but by and including the closed switch contacts A of relay S3, lead 10, lead 8, secondary winding of transformer X1, lead 16, normally closed switch contacts of relay S4, lead 15, lead 14, lead 13 to one side of coil winding of relay S3, from the other side of coil of relay S3, lead 12, lead 11, lead 9, and back to complete the closed circuit to switch contacts A of relay S3. The result will be to hold relay S3 energized, without possibility of its being affected by any intermittent opening and closing of switch contacts of relay S2 under the action of the intermittent current referred to.

The closing of switch contacts B and C of relay S3 closes an electrical circuit to and including leads L1 and L2 as follows: L1, lead 53, closed switch contacts B of relay S3, lead L5 to one side of the coil winding of direct current relay S5, the other side of the coil winding of direct current relay S5, lead L4, closed switch contacts C of relay S3, to lead L2 and thus to close the circuit. With the closing of this circuit direct current relay S5 is energized, among other things, and closes its normally open switch contacts. These closed switch contacts are thus placed in short circuit across the normally closed switch contacts of relay S4. The closed circuit energizing and making operable relay S3, including one side of the coil winding of relay S3, lead 12, lead 11, lead 9, closed switch contacts A of relay S3, lead 10, lead 8, the secondary winding of transformer X1, lead 16, closed switch contacts of relay S4, lead 15, lead 14, lead 13, and back to the other side of the coil winding of relay S3, is augmented and maintained closed by the closed switch contacts of relay S5 being placed in short circuit across the normally closed switch contacts of non-energized relay S4.

With the energizing of relay S3 and the closing of its switch contacts B and C and the resultant connection to leads L1 and L2 of the leads L5 and L4 respectively, a further closed circuit is established to and including lead L1 and lead L2 (this closed circuit is in shunt connection with and across the coil winding of direct current relay S5 which is likewise in a circuit closed to and including lead L1 and lead L2). The closed circuit so established is: lead L1, closed switch contacts B of relay S3, lead L5, lead L7, one side of the primary winding of transformer X5, the other side of primary winding of transformer X5, lead 29, resistance R5, lead 27, lead L6, lead L4, closed switch contacts C of relay S3, and return to lead L2 to close the circuit.

The closing of the latter circuit, above described, places an electrical load composed of resistance R5 and the primary winding of transformer X5 across telephone leads L1 and L2. The making of this electrical connection brings about the operation of devices, not shown, that result in the cessation of the "intermittent" alternating current referred to in the telephone circuit to which leads L1 and L2 are connected. The actuation of these devices likewise result in the establishment and stabilization of the "sustaining" current in said telephone circuit and in the leads L1 and L2. The stabilized conditions of said circuit will thereafter persist so long as resistance R5 and primary winding of transformer X5 remain in shunt across said circuit, or until said circuit is interrupted either manually, such as by changing the circuit characteristic by hanging up the receiver of a telephone connected in said circuit, or automatically.

It has been previously described how the circuit to and including direct current relay S5 and telephone leads L1 and L2 is closed by the energization of relay S3. With the stabilization of the "sustaining" direct current in leads L1 and L2 coincident with the operation of relay S3 and the resultant cessation of the "intermittent" alternating current, the normally open switch contact points of direct current relay S5 close as before described. These switch contact points continue to remain in the closed position until deenergization of relay S5 as hereinafter described.

From the description so far provided, it will be seen that with the apparatus supplied with appropriate electric power, with switch S1 in the closed position, and with leads L1 and L2 connected to a telephone circuit as previously described, a call placed to the telephone circuit to which the apparatus is connected will, on the first surge of the "intermittent" ringing current, energize the relay S2 so as to momentarily close its normally open switch contact points; that the momentary closing of the switch contact points of relay S2 closes an electrical circuit including a source of electric power and the coil winding of relay S3; that the closing of switch contact points B and C of relay S3 completes and closes a circuit to and including a telephone circuit, not shown, and to and including said circuit and leads L1 and L2 and the coil winding of direct current relay S5; and, that the electrical load of resistance R5 and the primary winding of transformer X5 in shunt circuit across the coil winding of relay S5 is consequently imposed as a closed circuit to and including lead L1 and lead L2 and the telephone circuit to which these leads are connected. It will also be seen that immediately upon the above things taking place, the "intermittent" current is caused to cease and to be thereupon replaced with the stabilized conditions of the "sustaining" current.

When the circuit including the relay S3 was first closed, electrical current will have passed through lead 12, the coil winding of delayed action relay S4, and lead 13. The relay S4 is of a type, well known in the art, that is adapted to operate after a delay following the completion of an electric circuit through its field winding.

When, after such delay, relay S4 actuates, it operates to open its normally closed switch contacts. These switch contacts are connected to leads 16 and 15 respectively and formed a part of the initially closed circuit including the coil winding of relay S3 and a source of electric power previously described. With the opening of the normally closed switch contact points of delayed action relay S4, the closed circuit to and between the source of electric power and coil windings of relays S3 and S4 is maintained in a closed circuit condition because of the closed condition of the switch contact points of relay S5, previously described. The closed circuit thus maintained includes lead 8, lead 10, closed switch contact points of A of relay S3, lead 11, lead 12, one side of the coil windings of relay S3 and delayed action relay S4, the other side of the coil windings of relay S3 and delayed action relay S4, lead 13, lead 14, lead 15, closed switch contacts of relay S5, lead 16, one side of secondary winding of power transformer X1, the other side of that winding to lead 8 and thus to complete and close the circuit.

As heretofore described, direct current relay S5 became energized and caused its normally open switch contacts to close coincident with the closing of a circuit to and including its field coil, leads L1 and L2, and the telephone circuit, not shown, but connected with said leads. The flowing through or over that closed circuit of the "sustaining" current will persist in maintaining relay S5 energized and in an operated condition so long as the "sustaining" current is uninterrupted.

Upon the interruption, changing of polarity, or any similar change in the "sustaining" current in circuit to and including leads L1 and L2, through the field winding of relay S5, the relay S5 will be deenergized, thus releasing its switch contact points, which return to the normally open position.

Accordingly, the opening of switch contact points of relay S5 thus opens the closed circuit including a local source of electric power, of which those contact points are a part. With the described closed circuit thus broken or opened, relays S3 and S4 become deenergized and release their respective operated switch contact points. The switch contact points of relay S3 therefore revert to their normally open positions while those of relay S4 revert to their normally closed position. This is so because the switch contact points of delay acting relay S4 and the closed circuit of which those switch contact points had been a part had been maintained in closed circuit by the closed switch contact points of relay S5, said contact points of relay S5 being connected in shunt across the switch contact points of relay S4 as hereinbefore described.

From the described circuit above provided, it will be observed that with switch S7 closed and the apparatus connected to a source of electric power by leads to the primary winding of transformer X1, upon the first surge of "intermittent" current over leads L1 and L2, relays S2, S3, S5 and S4 will, in turn become energized and operate; that upon such operation of those relays the "intermittent" alternating current will be caused to desist and be replaced with the "sustaining" direct current in closed circuit including lead L1 and L2, L4, L5, L6, L7, relay S5, primary winding of transformer X5, lead 29, resistance R5, lead 27, lead L6 to complete and close the circuit; and, that upon interruption of said "sustaining" current the relay S5 is deenergized and its switch contact points are caused to return to their normally open position, and further, that upon the opening of switch contact points of the relay S5, the circuit closed to and including those switch contact points is thus broken resulting in relays S4 and S3 becoming deenergized and returning to their respective inoperative condition. The closed circuit thus opened to the local source of electric power causes the apparatus to cease operating and to return to its original standby or inoperative condition.

The interruption of the "sustaining" current may, among other things, be caused by the calling party hanging up his telephone instrument. Such action causes an interruption or change in the characteristic of the "sustaining" current, and this change in said current to and through the field winding of relay S5 deenergizes said relay and causes its normally open contact points to return to said normal open position. The illustrated circuits are thus returned to their original or starting condition. A subsequent call will again, with switch S7 closed and the apparatus connected as described, set into motion the electrical sequences described.

PHASE TWO

*Segregating or balancing network*

This phase consists of a novel segregating or balancing network consisting of electrical components, in combination, in closed series, and shunt connection paths with and including leads L1 and L2 and a telephone circuit, not shown. By the novel and appropriate arrangement of these electrical components, the required balancing is obtained in the circuits comprising the Phase Two, Phase Three and Phase Four portions of this invention and the telephone circuit, not shown, to which it is connected. The attenuation and electrical balancing of the several circuits of this device so obtained, permits the joint and approximate simultaneous connection to a common pair of leads L6 and L7 of a vacuum tube voltage generator or "transmitter" (Phase Four) and a vacuum tube voltage amplifier or " receiver" (Phase Three), in complement to each other and without impairment of operation of the several electrical circuits comprising this invention. This is accomplished without introducing undesirable electrical changes or irregularities within the apparatus or within the telephone circuit to which, by means of and including leads L1 and L2, the device is connected.

The electrical components making up the Phase Two portion of this novel device consists of resistances R4, R5, R6, and R7, condensers C3 and C4, and inductances X4 and X5, the latter being the secondary winding of transformer X4 and primary winding of transformer X5 respectively. Connected in circuit as hereinafter described, impulses carrying sound voltage flowing from the Phase Four circuits, as shown, are "zeroed out," cancelled and made ineffective with respect to the secondary winding of transformer X5 of the vacuum tube voltage amplifier "receiver" hereinafter described as the Phase Three portion of this invention.

The flowing of the sound impulse carrying voltage generated by the illustrated circuits shown as Phase Four, are inductively passed from primary winding of transformer X4 to one side of the secondary winding of that transformer, lead L6, lead L4, closed switch contacts C of relay S3, lead L2, one side of a telephone circuit to which that lead is connected, and from the other side of secondary winding of transformer X4, lead 26, condenser C4, lead 26, resistance R7, lead L7, lead L5, closed switch contacts B of relay S3, lead L1 to the other side of the telephone circuit, not shown, to which said lead is connected and thus to complete the closed circuit.

Connected to one side of the secondary winding of transformer X4 and in shunt connection between lead L6 and L7, is the lead 27, resistance R6 and condenser C3 which, in turn is connected to lead L7 and to one side of the primary winding of transformer X5. Connected to that same side of the primary winding of transformer X5 and to lead L7 is the resistance R7, lead 26, condenser C4, lead 26 which is connected to the other side of the secondary winding of transformer X4. These circuits, so described, form the paths for the flowing or passage of the sound impulse carrying voltage generated ("transmitted") by the Phase Four portion of the device to and including the telephone circuit to which the apparatus is connected.

From the above it will be observed that any voltages generated by the vacuum tube generator "transmitter" illustrated as Phase Four circuits hereof, will flow by induction in or through secondary winding of transformer X4, lead L6, lead L7, lead L4, lead L5, lead L1 and lead L2, to the telephone circuit to which said latter leads are connected.

From the above it will also be observed that the generated voltages will, with respect to being induced into the secondary winding of transformer X5 and thence into the vacuum tube voltage amplifier "receiver" illustrated as Phase Three of this device, be "zeroed out" or cancelled and will therefore not be effective with or amplified by the said vacuum tube voltage amplifier "receiver." This is so because the voltages generated by the vacuum tube voltage generator "transmitter" above described, will, when induced into the secondary winding of transformer X4, flow or pass from said secondary winding to leads L6 and L7 as above described. The voltages thus generated will not flow or pass through the primary winding of transformer X5 primarily because said voltages flow only to one side of primary winding of transformer X5 from the two sides of secondary winding of transformer X4 over leads having capacitance and resistance of respective equal values and, that the connecting to lead L7 of these two electrically equal leads cancels or "zeroes out," with respect to transformer X5, voltages flowing from the secondary winding of transformer X4. Said voltages flow, not to or through transformer X5, but instead flow out or over lead L7 and lead L6 which form a part of the circuit closed to and including the telephone circuit as above described. Secondarily, voltages induced into the secondary winding of transformer X4 are further prevented from becoming effective on or with the secondary winding of transformer X5 and consequently the vacuum tube voltage amplifier "receiver" because the other side of the primary winding of transformer X5, lead 29, resistance R4 or resistance R5 respectively, offer paths of greater electrical resistance and delay to such generated voltages induced into and flowing from the secondary winding of transformer X4. Because of these facts, the voltages so generated are ineffective with and upon transformer X5.

Conversely, voltages carrying sound impulses from the telephone circuit to which the apparatus is connected by means of leads L1 and L2, cannot be effective upon the vacuum tube voltage generator "transmitter" as illustrated, but will flow along a direct electrical path to and will be effective upon the vacuum tube voltage amplifier "receiver" described hereinafter as Phase Three. This is so because such a circuit has been closed to the telephone circuit to which the apparatus is connected with and including the following: L2 attached to one side of the telephone circuit, not shown, closed switch contacts C of relay S3, lead L4, lead L6, lead 27, resistance R5, lead 29 to one side of primary winding of transformer X5, the other side of primary winding of transformer X5, lead L7, lead L5, closed switch contacts B of relay S3, lead L1 to the other side of the telephone circuit, not shown, and thus to close the circuit.

The novel balancing and segregating network above described, is the preferred method of permitting the invention to operate as designed. Other less efficient and effective means may be utilized however for making the apparatus operable to a lesser degree of efficiency. To name one such means reference is made to Figure 2 of the diagram. This figure illustrates the use of a six winding hybrid coil of balanced proportions as it would be used for making the invention operable.

With reference to Figure 2 and substituting therein transformers X1 and X6 for transformers X5 and X4 respectively of Figure 1, and with leads L6 and L7, Figure 2 connected to L4 and L5 of Figure 1 instead of as shown in Figure 1, the six winding hybrid coil represented as X2, X3, X4, and X5 of Figure 2, will, together with its balancing network resistor R1 and condenser C1, act to make the invention operable. Although operable with such an arrangement, the apparatus will be less efficient than by the use of the novel segregating and balancing network heretofore described.

PHASE THREE

*Vacuum tube voltage amplifier "receiving" circuit*

The vacuum tube voltage amplifier, in circuit combination as illustrated in Figure 1, is a novel arrangement of vacuum tubes T3, T4 and T5 and associated inductances, resistors, and capacitors, a source of electrical power and a loud speaker. While such a voltage amplifier is not new to the art, its use in combination described, is both original and novel.

With reference to Figure 1 and to Phase Three thereof in detail, with switch S8 closed and the primary winding of transformer X2 connected to an appropriate source of electrical power, current will be induced into the secondary windings of that transformer. With the two secondary windings of transformer X2 connected as illustrated, leads 46 and 47 from one such secondary winding are connected to the two plates respectively of rectifier tube T5. With the other secondary winding of transformer X2 connected by leads 44 and 45 respectively to the heater or filament of tube T6, the tube will function to rectify into positive direct current the alternating current so delivered to it from secondary winding of transformer X2. The negative side of this direct current is developed as illustrated, by grounding to the common ground of the apparatus, the mid or node point of each of the secondary windings of transformer X2. Lead 43, connected to the cathode of tube T5, carries the high potential positive direct current to the plate element of output tube T4 via lead 41, primary winding of loudspeaker LS coupling transformer X6 and lead 40. Connected to lead 43 is a conventional filter and voltage reducing network consisting of condensers C8, C9 and resistor R12. Appropriate resistors and capcitors in correct and conventional circuit to the other elements of output tube T4 and first amplifier tube T3, will, when voltage carrying sound impulses is induced into secondary winding of transformer X5 from its primary winding, cause such voltage to be amplified and emitted in a greater or lesser amount from loudspeaker LS. The extent of volume of sound so emitted is adjustable by the operator of the device by means of the adjustable volume control resistor R10 provided for that purpose, said adjustable means controlling the amount of input voltage to the grid element of output tube T4 which in turn emits a greater or lesser amount of such voltage carrying sound impulses to loudspeaker LS, in circuit, with a resulting greater or lesser sound output by said loudspeaker.

PHASE FOUR

*The vacuum tube voltage generating "transmitting" circuit*

The vacuum tube voltage generating or "transmitting" circuit, in circuit combination as illustrated in Figure 1, is a novel arrangement of vacuum tubes T1, T2 and T5 and associated inductances, resistors and capacitors, a source of electrical power and a microphone. While such a voltage generator is not new to the art, its use in combination described, is both original and novel.

With reference to Figure 1 and to Phase Four thereof in detail, with switch S8 closed and the primary winding of transformer X2 conected to an appropriate source of electric power, current will be induced into the secondary windings of that transformer. With the two secondary windings of transformer X2 connected as illustrated, proper and appropriate direct current voltage will be supplied, not only to the elements of voltage generating vacuum tubes T1 and T2, but likewise to resistors, capacitors, inductances and microphone in circuit as illustrated, comprising the Phase Four portion of Figure 1.

By the means above provided, it therefore logically follows that when audible sound waves are impressed upon the diaphragm of microphone MIC, such sound waves will, in the form of increased voltage, be impressed upon the grid element of first voltage amplifying (generating) tube T1. By the peculiar functions of that tube, such voltages will be increased and again impressed, by appropriate circuits, on the grid element of second voltage amplifying (generating) tube T2. Again, by the peculiar functions of that tube, such increased or generated voltages will flow from the plate element of that tube, lead 24 and, among other things will flow to and through the primary winding of transformer X4. These sound impulse carrying voltages will be induced into the secondary winding of transformer X4 in closed circuit, as heretofore described, to and including the telephone circuit to which the apparatus is connected by its leads L1 and L2.

From the above and other description provided, it is shown to be a fact that when microphone MIC picks up audible sound waves, such sound waves are converted into voltages carrying sound impulses, that such voltages are amplified (generated) as they progress in circuit combination through the vacuum tube voltage generating "transmitting" circuit above described and, that by circuit combination those increased voltages are impressed into or upon the telephone circuit not shown, to which the apparatus is connected by leads L1 and L2. Also, as previously described, such amplified or generated "transmitting" voltages will, with respect to the Phase Three amplifier "receiving" circuits above described, be "zeroed out," cancelled and ineffective upon said Phase Three circuits.

While the description above provided describes the preferred use of the invention in conjunction with a telephone circuit, not shown, a secondary and further novel use of the apparatus is claimed.

Figure 3 illustrates two loudspeaker/microphone units LS–1 and LS–2 which may, in circuit, be in any nominal quantity. By appropriate circuits, one of which is illustrated, these may be connected in circuit to the Phase Two, Phase Three and Phase Four portions of the apparatus, Figure 1. Such loudspeaker/microphone units, as in any conventional intercommunication device, may be physically located at places remote from the said phase portions of the apparatus. By connecting lead L6 and L7 of Figure 3 to lead L6 and L7 respectively of Phase Two, Figure 1, and by disconnecting leads L4 and L5 from L6 and L7, Figure 1, and with the apparatus energized by a source of electric power, normal two-way uninterrupted conversation may be held between persons located at the apparatus and at any one or more of the remotely located loudspeaker/microphone units. By an appropriate switching arrangement, not shown, such conversations may be by and between a single individual or multiple loudspeaker/microphone units remotely located from the apparatus.

I claim:

1. A sound amplifying apparatus of the class described, comprising: a pair of telephone leads for connection to a telephone instrument to provide intelligence transmission paths between a caller and a callee; a balancing and segregating network including first and second transformer windings at opposite sides thereof, a pair of leads respectively extending from one end of the respective windings, a first resistance and condenser connected in series between said ends of the windings, and a second resistance and condenser connected in series between said one end of the second winding and the other end of the first winding; leads connected between the respective second named leads and the telephone leads, each of the last named leads including a normally open set of contacts; a receiving amplifier including a transformer winding coupled with the first transformer winding; a transmitting amplifier including a transformer winding coupled with the second transformer winding; and means responding to the impression of ringing current on the telephone leads by a caller for closing both of said sets of contacts to permit the transmission of intelligence between a caller, and a callee located within the effective acoustical range of the respective amplifiers.

2. A sound amplifying apparatus of the class described, comprising: a pair of telephone leads for connection to a telephone instrument to provide intelligence transmission paths between a caller and a callee; a balancing and segregating network including first and second transformer windings at opposite sides thereof, a pair of leads respectively extending from one end of the respective windings, a first resistance and condenser connected in series between said ends of the windings, and a second resistance and condenser connected in series between said one end of the second winding and the other end of the first winding; leads connected between the respective second named leads and the telephone leads, each of the last named leads including a normally open set of contacts; a receiving amplifier including a transformer winding coupled with the first transformer winding; a transmitting amplifier including a transformer winding coupled with the second transformer winding; and means responding to the impression of ringing current on the telephone leads by a caller for closing both of said sets of contacts to permit the transmission of intelligence between a caller, and a callee located within the effective acoustical range of the respective amplifiers, said contact-closing means including a first relay in circuit with said leads and adapted to be temporarily energized by said ringing current, a second relay connected in circuit with a source of electrical power and operative for closing both of said sets of contacts when energized, and a third set of normally open contacts in circuit with the second relay and closed by energizing of the first relay to energize the second relay.

3. Apparatus as in claim 2, further including a third relay connected between the second named leads and including a set of normally open contacts in circuit with said source of power and with the second relay, said last named contacts closing on energization of the third relay to hold the second relay in an energized condition during the transmission of intelligence between caller and callee.

4. Apparatus as in claim 3, wherein said network further includes a resistance coupled with the first transformer winding in shunt across said telephone leads, to impose an electrical load thereupon effective to cause a cessation of the ringing current and a stabilization of a sustaining current in the telephone leads.

5. Apparatus of the class described comprising a pair of leads adapted for connection in a sound-impulse-transmission circuit to permit the transmission of intelligence between parties at opposite ends of said circuit, said leads being disposed at one end of said circuit; a second pair of leads; connections between the respective second and first named leads including normally opened sets of contacts; a balancing and segregating network having opposite sides connected to the respective second named leads; a receiving and a transmitting amplifier respectively coupled inductively to the respective opposite sides of the network; series-connected pairs of resistances and condensers extending between the opposite sides of said network; and means responding to the impression of an intermittent signalling current for closing said sets of contacts.

6. In an in-out amplifier system for one end of a communications apparatus over which sound impulses are transmitted to provide for the transmission of intelligence between parties at opposite ends of the apparatus, a pair of leads through which sound impulses are transmitted; a balancing and segregating network having its opposite sides provided with connections to the respective leads, said network including, at opposite sides thereof, first and second transformer windings, a first condenser and resistance connected in series between one end of the respective windings, and a second resistance and condenser connected in series between one end of the first transformer winding and the other end of the second transformer winding; a receiving amplifier including a transformer winding inductively coupled with the first transformer winding; and a transmitting amplifier including a transformer winding inductively coupled to the second transformer winding.

7. In a balancing and segregating network for a sound-impulse-transmitting apparatus including a pair of sound impulse transmission leads, and an amplifying receiver and an amplifying transmitter each having a transformer winding, a pair of leads adapted for connection to said sound impulse transmission leads; first and second transformer windings respectively connected at one end to the respective second named leads and adapted for conductive coupling to the windings of said receiver and transmitter respectively; a first condenser and resistance connected in series between one end of the first winding and one end of the second winding; and a second resistance and condenser connected in series between said one end of the first winding and the other end of the second winding.

8. A balancing and segregating network as in claim 7, further including a resistance connected at one end to the first resistance and condenser and at its other end to the second resistance and condenser.

References Cited in the file of this patent

UNITED STATES PATENTS

| | | |
|---|---|---|
| 2,281,255 | Augustadt | Apr. 28, 1942 |
| 2,369,351 | Herrick | Feb. 13, 1945 |